No. 869,395. PATENTED OCT. 29, 1907.
F. SCHLETH.
SIGHT TELESCOPE.
APPLICATION FILED DEC. 9, 1905.
2 SHEETS—SHEET 1.
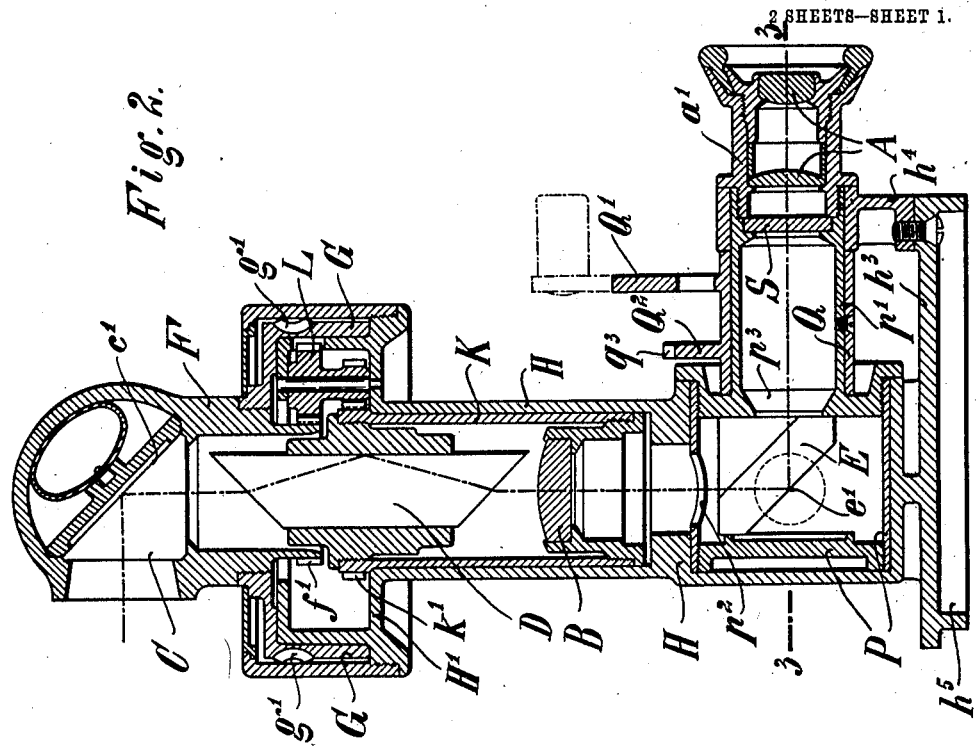
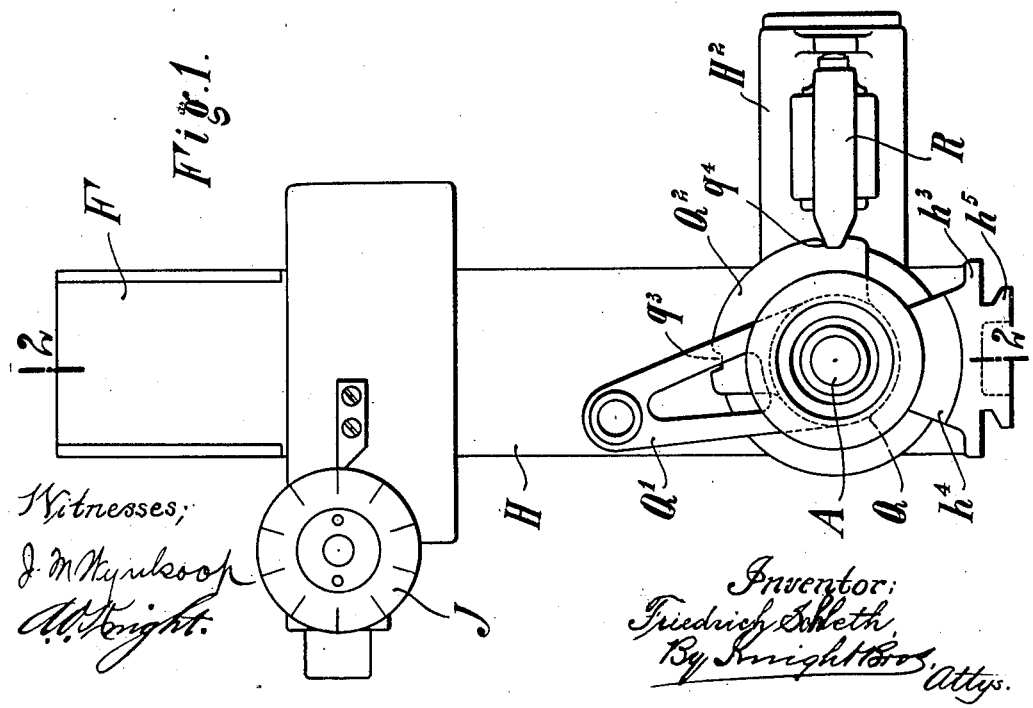

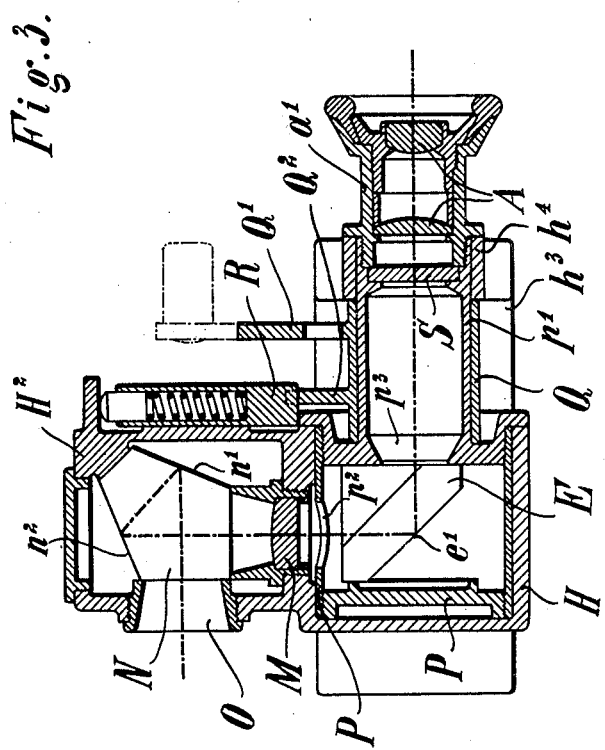

UNITED STATES PATENT OFFICE.

FRIEDRICH SCHLETH, OF ESSEN-ON-THE-RUHR, GERMANY, ASSIGNOR TO FRIED. KRUPP AKTIENGESELLSCHAFT, OF ESSEN-ON-THE-RUHR, GERMANY.

SIGHT-TELESCOPE.

No. 869,395.      Specification of Letters Patent.      Patented Oct. 29, 1907.

Application filed December 9, 1905. Serial No. 291,141.

*To all whom it may concern:*

Be it known that I, FRIEDRICH SCHLETH, a subject of the Emperor of Germany, and a resident of Essen-on-the-Ruhr, Germany, have invented certain new and useful Improvements in Sight-Telescopes, of which the following is a specification.

The present invention relates to sight telescopes for guns and particularly to the kind of telescopes that are provided with a rotatable reflector for the entering rays of light for the purpose of making it possible, by means of the telescope, to take aim at any target located in the range of action of the gun without changing the lateral direction of the optical axis of the eye-piece. Such sighting devices are known under the name of panoramic sight-telescopes, and the object of the present invention is to construct these telescopes in such a manner that the person who looks into the eye-piece may also take aim independently of the rotatable reflector.

One embodiment of the invention is shown in the accompanying drawing by way of example.

Figure 1 is a rear view of the sight-telescope; Fig. 2 is a section on line 2—2, Fig. 1, and Fig. 3 is a section on line 3—3, Fig. 2, with changed position of some of the parts.

The telescope is provided with an eye-piece A, an objective B (Fig. 2), a prism C which serves as reflector for the entering rays of light, an image-inverting prism D and a so-called roof edge prism E. The prism C, which is provided with a reflecting face $c^1$, is mounted in a housing F (Figs. 1 and 2) which is rotatably arranged on an enlargement $H^1$ of the telescope housing proper H, through the medium of a sleeve G (Fig. 2) screwed to the housing F. The reflector C is rotated by means of a hand-wheel J (Fig. 1) which is connected with a worm (not shown in the drawing), which engages with teeth $g^1$ (Fig. 2) on the sleeve G. In every position to which it may be rotated the reflector C is adapted to reflect rays of light to the objective B. The prism D and the objective B are carried by a sleeve K (Fig. 2) rotatably arranged in the telescope housing H. By means of gear-wheels L, $f^1$, $k^1$ (Fig. 2) the sleeve K is connected with the housing F in such a manner that when the reflector C is rotated the prism D and the objective B rotate in the same direction as the reflector but at only half the angular speed. The construction and relative arrangement of the parts hitherto described are known to be old and no invention *per se* is claimed therefor.

The telescope is provided with a second objective M (Fig. 3) and a corresponding prism N. The objective M is rigidly secured in one of the side walls of the telescope housing H and its optical axis is at right angles to the plane containing the optical axes of the eye-piece A and of the objective B and passes through the point of intersection of the said two axes. The prism N is provided with two reflecting faces $n^1$ and $n^2$ and rests in a lateral projection $H^2$ on the telescope housing, the rays of light entering the prism N at O (Fig. 3). In order to bring the eye-piece A by means of the prism E into operative optical relation to the objective M, the prism E is mounted in a cylindrical casing P (Figs. 2 and 3) which is rotatably arranged in the telescope housing H.

The casing P is provided with openings $p^2$ and $p^3$ for the passage of the rays of light and also provided with a tubular projection $p^1$ which is rigidly connected with the eye-piece housing $a^1$. A pedestal $h^4$ secured on the base-plate $h^3$ of the telescope housing serves as bearing for the free end of the projection $p^1$. On the projection $p^1$ is secured a sleeve Q provided with a crank $Q^1$ by means of which the prism E may be brought from either one of the positions of use shown in Figs. 2 and 3 to the other position. The prism E is held in its positions of use through the medium of a locking mechanism consisting of a spring-pressed bolt R slidably mounted in the part $H^2$ of the housing and two notches $q^3$, $q^4$ (Figs. 1 and 2) which are provided in a flange $Q^2$ of the sleeve Q and which are located at an angle of 90 degrees to one another. On the projection $p^1$ is secured a glass plate S which has an aiming mark. The base plate $h^3$ of the telescope housing is provided with a dove-tail shaped foot $h^5$ (Figs. 1 and 2) which, when the telescope is in use, is inserted in a groove in the head of an attachment bar.

In combination with the attachment bar, the telescope forms a telescope-sight which, when the prism E and the opening $p^2$ of the casing P assume the position shown in Fig. 2 relatively to the objective B, may be used for aiming by means of auxiliary target, that is to say, for indirect aiming, in the manner customary for sights with panorama sight-telescopes. In this position of the prism E, the bolt R engages with the notch $q^4$ (Fig. 1).

If it is desired to use direct aiming instead of indirect aiming, the crank $Q^1$ is turned clockwise until the bolt R engages with the notch $q^3$. The prism E and the opening $p^2$ of the casing P are then in the position shown in Fig. 3 relatively to the objective M. In this position of the several parts, no rays of light can pass from the objective B to the prism E and the eye-piece A. The rays of light entering at O (Fig. 3) have, however, free passage to the prism E and the eye-piece A, and the person who looks into the eye-piece is, therefore, able to aim, by means of the prism E, the objective M and the prism N in the same manner as in an ordinary sight-telescope having broken optical axis.

By means of the improved sight-telescope it is possible to change very rapidly from indirect to direct aiming, as it is merely necessary to change the position of the prism E by means of the crank, while in the ordinary panoramic sight-telescopes it is necessary to adjust the reflector, which is directed against the auxiliary target, to the intermediate position shown in the drawing which adjustment takes considerable time.

If it is desired to change from direct to indirect aiming the position of the prism E is changed from the position shown in Fig. 3 to that shown in Fig. 2 by means of the crank $Q^1$.

Having described my invention, what I claim as new is:

1. In a panoramic sight telescope, an eye piece, a main objective whose axis intersects the axis of the eye piece, an auxiliary objective whose axis also intersects the axis of the eye piece, and a prism rotatable into position to transmit rays of light to said eye piece from either of said objectives.

2. In a panoramic sight telescope, an eye piece, a main objective and an auxiliary objective having their respective axes intersecting in a point, and a rotatable prism having its axis of rotation intersecting the three said axes before mentioned, said prism being adapted to transmit rays of light to the eye piece from either of said objectives.

3. In a panoramic telescope, an eye piece, a plurality of objectives positioned within the telescope in such manner as to be capable of receiving entering rays of light from different directions, and a prism rotatable into position to transmit rays of light to said eye piece from either of said objectives, as desired.

4. In a panoramic telescope, an eye piece, a main objective whose main axis lies in the same vertical plane as that of the eye piece, an auxiliary objective whose main axis lies in the same horizontal plane as that of the eye piece, and means whereby either of said objectives may be brought into operative optical relation with said eye piece as desired.

5. In a panoramic telescope, an eye piece, a rotatable prism whose axis of rotation coincides with the main axis of said eye piece, and a plurality of objectives transmitting light into the telescope and so positioned as to permit the light from each to be successively transmitted to said eye piece by means of said rotatable prism.

6. In a panoramic telescope, an eye piece, an objective with its axis in the same horizontal plane, a second objective receiving light from above said plane, and means rotatable into position for transmitting the light from either of said objectives into said eye piece.

The foregoing specification signed at Düsseldorf this 18th day of November, 1905.

FRIEDRICH SCHLETH.

In presence of—
 PETER LIEBER,
 WILLIAM ESSENWEIN.